(12) United States Patent
Watanabe

(10) Patent No.: US 7,077,030 B2
(45) Date of Patent: Jul. 18, 2006

(54) ROTATIONAL INDEXING DEVICE FOR A MACHINE TOOL

(75) Inventor: Michio Watanabe, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 112 days.

(21) Appl. No.: 10/331,164

(22) Filed: Dec. 30, 2002

(65) Prior Publication Data

US 2003/0126728 A1 Jul. 10, 2003

(30) Foreign Application Priority Data

Dec. 28, 2001 (JP) ............... 2001-400796

(51) Int. Cl.
*B23Q 16/08* (2006.01)
(52) U.S. Cl. .................................. 74/813 R; 74/813 L
(58) Field of Classification Search .............. 74/813 L, 74/813 R
See application file for complete search history.

(56) References Cited

U.S. PATENT DOCUMENTS

| | | | | |
|---|---|---|---|---|
| 3,064,499 A | * | 11/1962 | Bullard | ...................... 74/822 |
| 5,540,120 A | * | 7/1996 | Sommer | ..................... 74/813 R |
| 6,095,014 A | | 8/2000 | Chen et al. | |
| 6,775,889 B1 | * | 8/2004 | Ohsawa | ........................ 29/42 |

FOREIGN PATENT DOCUMENTS

| | | | |
|---|---|---|---|
| GB | 2 111 873 A | | 7/1983 |
| JP | 60094257 A | * | 5/1985 |
| JP | 7-256538 A | | 10/1995 |
| JP | 9-19848 A | | 1/1997 |
| JP | 2002-160144 A | | 6/2002 |

* cited by examiner

*Primary Examiner*—Vicky A. Johnson
(74) *Attorney, Agent, or Firm*—Smith Patent Office

(57) ABSTRACT

A machine tool rotational indexing device is provided that is capable of avoiding or restraining the reduction in the preload force of any of rolling element rows or restraining the reduction in the support rigidity of the rotary-side coupling even if the preload is decreased. Rolling elements are arranged in a plurality of rolling element rows between a rotary-side coupling and a stationary-side coupling and a prescribed preload force acts when a joint coupling is located in an unclamped position. The rolling element rows are constructed of a first rolling element row arranged in a direction in which the preload force increases as the joint coupling moves to a clamped position and a second rolling element row arranged in a direction in which the preload force decreases. The first rolling element row is positioned farther apart from the meshing engagement portion of the couplings than the second rolling element row.

13 Claims, 6 Drawing Sheets

ROTATIONAL INDEXING DEVICE FOR A MACHINE TOOL

BACKGROUND OF THE INVENTION

1. Field of the Invention

The present invention relates to a machine tool rotational indexing device where a rotary section loaded with a workpiece or a tool is rotationally and indexably mounted in a specified rotational angle position and it is clamped in the indexed position on a fixed base.

2. Discussion of the Related Art

A horizontal machining center is sometimes provided with a rotational indexing device that has a processing table loaded with a workpiece. The processing table is rotationally indexed and the workpiece can be clamped in a specified rotational angle position which allows processing to be performed in this state.

In a rotational indexing device of this type, a 3-piece coupling type is provided. This includes a rotary-side coupling fixed to the processing table and a stationary-side coupling fixed to a fixed base. The rotary-side coupling and the stationary-side coupling are coaxially arranged. A joint coupling is arranged to move between a clamped position and an unclamped position. In the clamped position, the joint coupling is in engagement with both the rotary-side coupling and the stationary-side coupling and in the unclamped position, the joint coupling is spaced therefrom so that the meshing engagement is released.

Conventionally, in the above-mentioned rotational indexing device, it is sometimes the case where the rotary-side coupling is arranged outside the stationary-side coupling and rollers are interposed between both the couplings. Moreover, in an effort to improve the support rigidity of the rotary-side coupling, sometimes a structure for supporting the rotary-side coupling on a fixed base in both the clamped and unclamped positions by pressurizing and putting the coupling into sliding contact with the fixed base is adopted (see for example, Japanese Patent Laid-Open Publication No. HEI 7-256538 and Japanese Patent Laid-Open Publication No. HEI 9-19848).

However, the aforementioned conventional rotational indexing device, which puts the rotary-side coupling in sliding contact with the fixed base, has a concern about the possible occurrence of partial wear when an unbalanced load acts on the rotary-side coupling. Moreover, it is sometimes the case where a slide member or a hollow roller is provided on the sliding surface of the fixed base in order to reduce the sliding resistance. If this arrangement is adopted, there is a problem that the part count increases.

Accordingly, in view of the aforementioned conventional problems, the present inventor (with other coinventors) proposed a machine tool rotational indexing device where a plurality of rolling element rows are arranged between the rotary-side coupling and the stationary-side coupling, and an outer surface of the rotary-side coupling is only supported on the stationary-side coupling via the rolling element rows. This device was filed as Japanese Patent Application No. 2000-359491 and now has been published as Japanese Patent Laid Open Publication No. 2002-160144 (and is not prior art for this application).

According to the rotational indexing device of the aforementioned proposal, the plurality of rolling element rows are arranged between the rotary-side coupling and the stationary-side coupling. Therefore, the clamping force and the load that acts on the rotary section can be supported on the stationary-side coupling via the rolling elements of each row, and the support rigidity provided by the fixed base of the rotary-side coupling can be improved.

The device of the aforementioned proposal adopts a structure for imposing a preload force on the rolling elements of each row in a state where the joint coupling is in the unclamped position. However, it was discovered that the preload force of the rolling elements of any of the rows was reduced when the joint coupling was moved to the clamped position depending on the manner of imposing the preload force or the magnitude of the clamp load by the joint coupling. This sometimes caused a problem that sufficient support rigidity of the rotary-side coupling was not able to be obtained.

SUMMARY OF THE INVENTION

The present invention has been accomplished in view of the problems of the device of the aforementioned proposal and has an object of providing a machine tool rotational indexing device capable of avoiding or restraining a reduction in the preload forces of any of the rolling element rows or restraining a reduction in the support rigidity of the rotary-side coupling even if the preload force is decreased.

In a first aspect of the invention, there is provided a machine tool rotational indexing device having a rotary section which is loaded with at least one of a workpiece and a tool, the rotary section is rotationally and indexably mounted in a predetermined rotational angular position and clamped in an indexed position on a fixed base, the device comprising: a rotary-side coupling attached to the rotary section; a stationary-side coupling attached to the fixed base, the rotary-side coupling being arranged coaxially with the stationary-side coupling; a joint coupling disposed adjacent to both the rotary-side coupling and the stationary-side coupling, the joint coupling being arranged to move between a clamped position and an unclamped position, wherein the clamped position is where the joint coupling meshes with both the rotary-side coupling and the stationary-side coupling and the unclamped position is where the joint coupling is spaced apart from both the rotary-side coupling and the stationary-side coupling; and a plurality of rolling elements arranged between the rotary-side coupling and the stationary-side coupling so that a plurality of rolling element rows are formed and a prescribed preload force acts on the rolling elements when the joint coupling is disposed in the unclamped position, wherein a first rolling element row is positioned farther from the joint coupling than a second rolling element row, the rolling element rows being constructed between the rotary-side coupling and the stationary-side coupling so that the prescribed preload force increases on the first rolling element row and the prescribed preload force decreases on the second rolling element row when the joint coupling moves to the clamped position, and an outer surface of the rotary-side coupling being supported on the stationary-side coupling by the first and second rolling element rows.

In a second aspect of the invention, based on the first aspect of the invention, the rolling elements of the first and second rolling element rows each comprise a columnar roller, and rotational axes of adjacent rollers between the first and second rolling element rows intersect with each other.

In a third aspect of the invention, there is provided a machine tool rotational indexing device having a rotary section which is loaded with at least one of a workpiece and a tool, the rotary section is rotationally and indexably mounted in a predetermined rotational angular position and clamped in an indexed position on a fixed base, the device comprising: a rotary-side coupling attached to the rotary section; a stationary-side coupling attached to the fixed base, the rotary-side coupling being arranged coaxially with the stationary-side coupling; a joint coupling disposed adjacent to both the rotary-side coupling and the stationary-side coupling, the joint coupling being arranged to move between a clamped position and an unclamped position, wherein the clamped position is where the joint coupling meshes with both the rotary-side coupling and the stationary-side coupling and the unclamped position is where the joint coupling is spaced apart from both the rotary-side coupling and the stationary-side coupling; and a plurality of rolling elements arranged between the rotary-side coupling and the stationary-side coupling so that a plurality of rolling element rows are formed and a prescribed preload force acts on the rolling elements when the joint coupling is disposed in the unclamped position, the rolling element rows comprising a first row of rolling elements that are columnar rollers each having a rotational axis and a second row of rolling elements, first alternate rolling elements of the second row each having a rotational axis parallel to the rotational axis of an adjacent rolling element in the first row and second alternate rolling elements of the second row each having a rotational axis that will intersect with the rotational axis of an adjacent rolling element in the first row, the rolling element rows being structured between the rotary-side coupling and the stationary-side coupling so that the prescribed preload force increases on the rolling elements in the first row and the first alternate rolling elements of the second row and the prescribed preload force decreases on the second alternate rolling elements of the second row when the joint coupling moves to the clamped position, and an outer surface of the rotary-side coupling being supported on the stationary-side coupling by the first and second rolling element rows.

In a fourth aspect of the invention, based on any one of the first through third aspects of the invention, the rotary-side coupling is arranged inside the stationary-side coupling.

In a fifth aspect of the invention, based on any one of the first through fourth aspects of the invention, in the unclamped position, the rotary-side coupling protrudes slightly toward the joint coupling with respect to the stationary-side coupling.

According to the machine tool rotational indexing device of the first aspect of the invention, as the joint coupling moves to the clamped position, the preload force on the first rolling element row increases, and the preload force of the second rolling element row decreases. Therefore, in the clamped position, the load acting on the workpiece or tool of the rotary section is borne on the engaged portions of the rotary-side and stationary-side couplings and this is mainly the portion where the first rolling elements are arranged with an increased preload. Then, the magnitude of the support rigidity for bearing the bending moment acting on the coupling portion with this load increases in proportion to an interval between the engagement portion and the portion where the first rolling elements are arranged. In this embodiment, the first rolling element row is located farther apart from the meshing engagement portion than the second rolling element row. Therefore, the aforementioned interval can be increased, and accordingly, the support rigidity for the bending moment can be improved.

According to the second aspect of the invention, the rolling elements of the first and second rolling element rows are each made of a columnar roller, and the rotational axes of adjacent rollers between the first and second rolling element rows intersect with each other. Therefore, the clamping force and the load of the rotary section alternately act on the rollers of the first and second rolling element rows, and the support rigidity of the rotary-side coupling can be further improved.

According to the third aspect of the invention, the second rolling element row is provided with so-called cross roller bearings where the first roller and the second roller are preloaded in a manner where the preload force increases or decreases as the joint coupling is moved to the clamped position. Therefore, the preload force on the second roller of the second rolling element row decreases as the joint coupling is moved to the clamped position, whereas the preload force on the roller of the first rolling element row and the first roller of the second rolling element row increases. Therefore, the overall support rigidity can be secured.

According to the fourth aspect of the invention, the rotary-side coupling is arranged inside the stationary-side coupling. Therefore, the outside diameter of the stationary-side coupling can be made greater than that of the rotary-side coupling. This allows the support rigidity for the clamping force to be improved, and the support force of the rotary-side coupling in the clamping stage to be improved.

According to the fifth aspect of the invention, the rotary-side coupling protrudes slightly toward the joint coupling side with respect to the stationary-side coupling. Therefore, the joint coupling pressurizes the rotary-side coupling more than the stationary-side coupling in the clamped position so as to preload the rolling elements of each row. Thus, the support rigidity of the rotary-side coupling can be improved further.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which.

DETAILED DESCRIPTION OF THE PREFERRED EMBODIMENTS

Hereinbelow, embodiments of the present invention are described with reference to the accompanying drawings.

Figure 1:
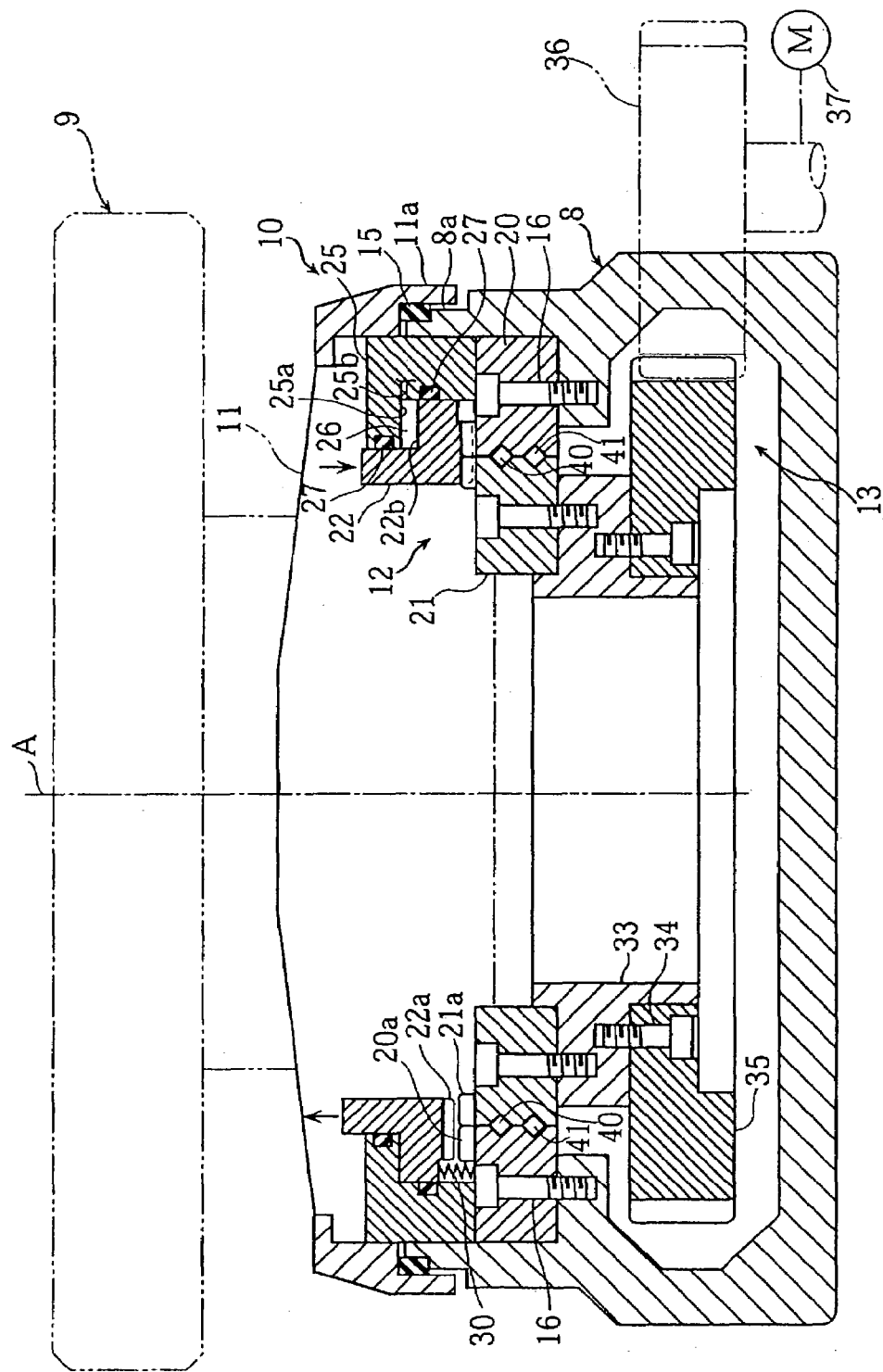
FIG. 1 is a sectional view for explaining a rotational indexing device according to a first embodiment of the present invention.
Figure 2:
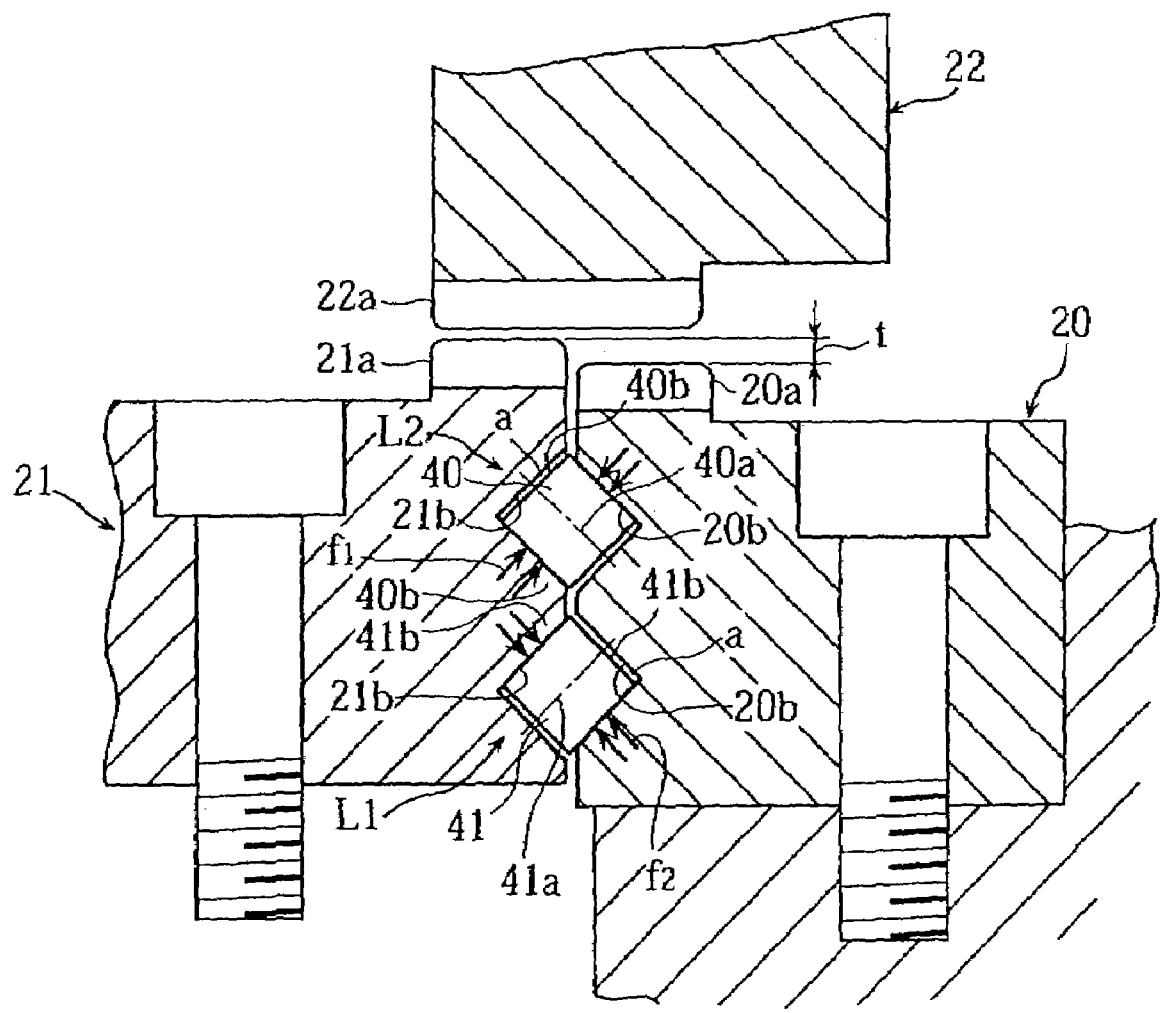
FIG. 2 is a detailed sectional view showing an unclamped state of a portion of the rotational indexing device shown in FIG. 1.
Figure 3:
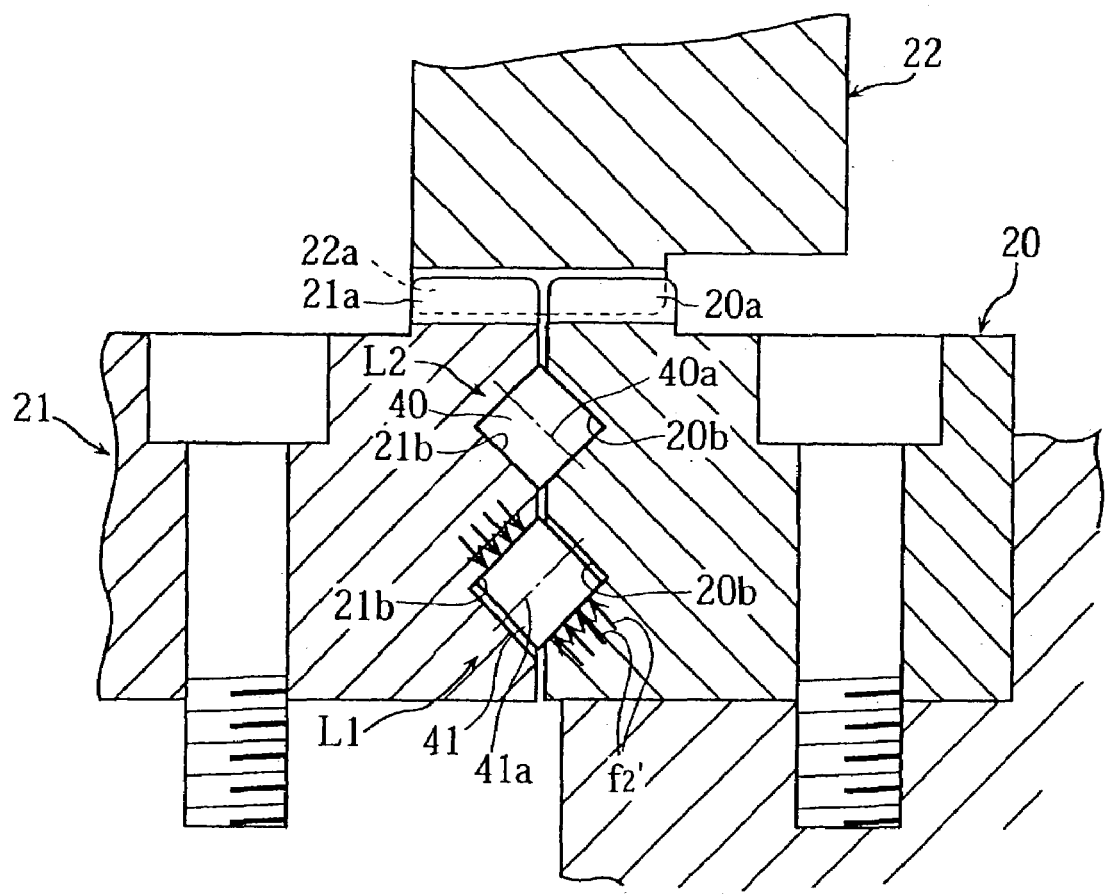
FIG. 3 is a detailed sectional view showing a clamped state of a portion of the rotational indexing device shown in FIG. 1.
Figure 4:
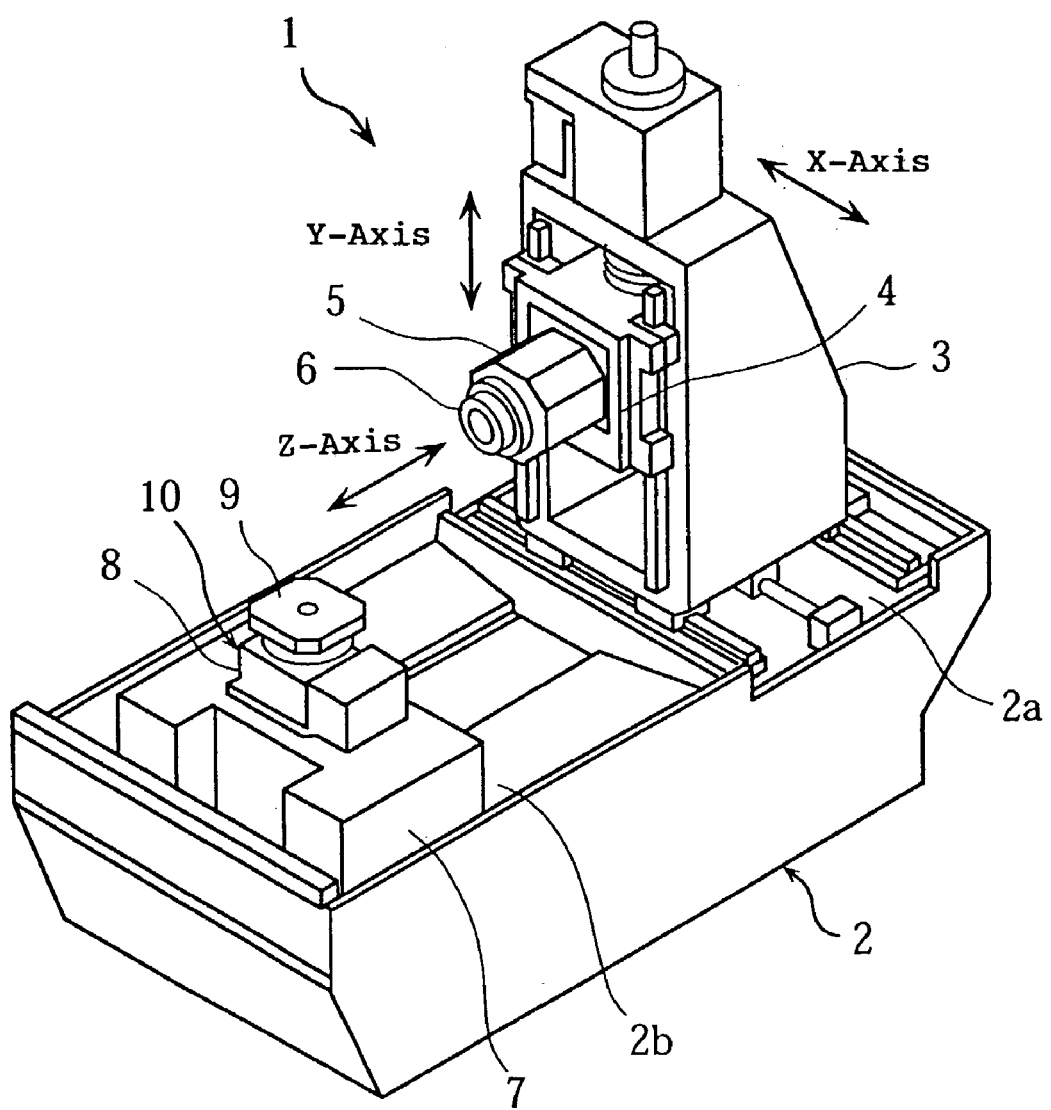
FIG. 4 is a perspective view of a horizontal machining center having the rotational indexing device according to the present invention mounted thereon.
Figure 5:
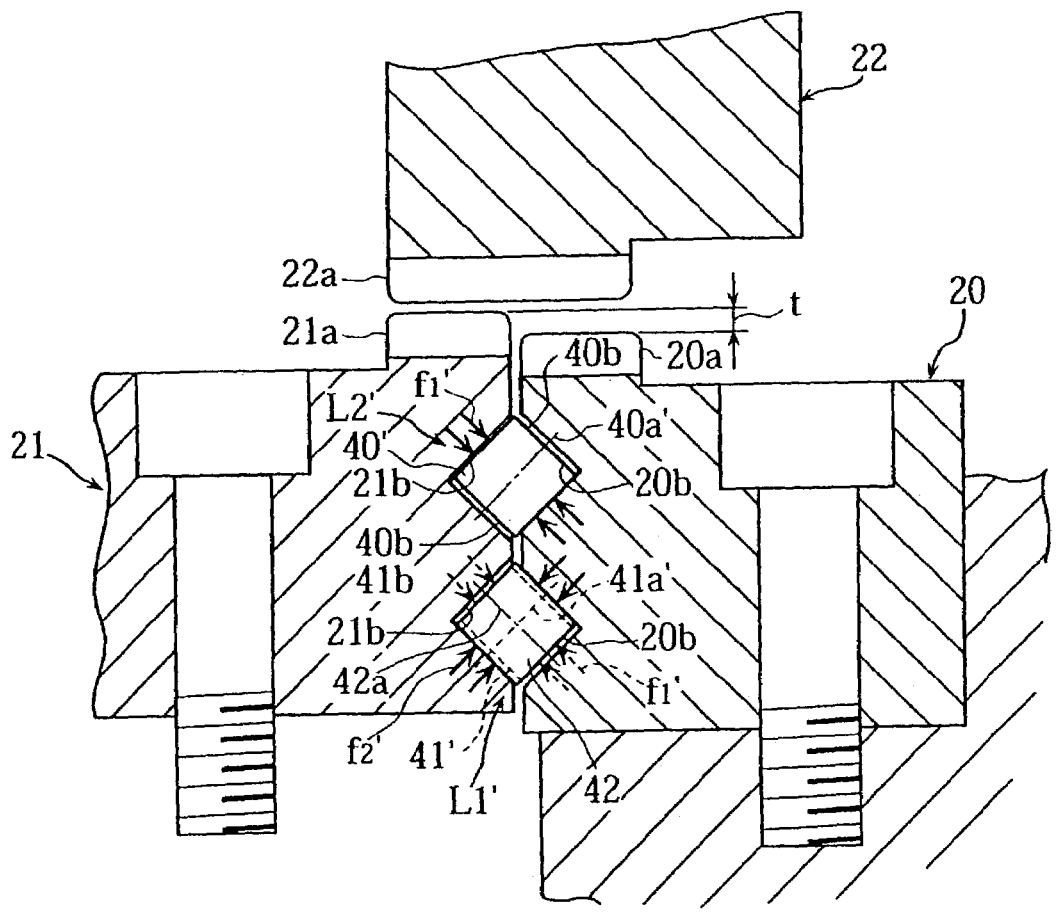
FIG. 5 is a sectional view showing an unclamped state of a portion of a rotational indexing device according to a second embodiment of the present invention.
Figures 6, 7:
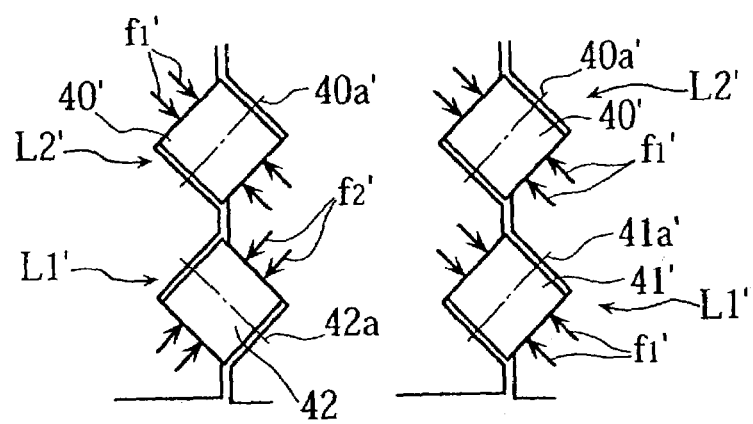
FIG. 6 is a schematic drawing of one set of rolling elements disposed between the rotary-side coupling and the stationary-side coupling according to the second embodiment of the present invention.
FIG. 7 is a schematic drawing of a second set of rolling elements disposed between the rotary-side coupling and the stationary-side coupling according to the second embodiment of the present invention.
Figure 8:
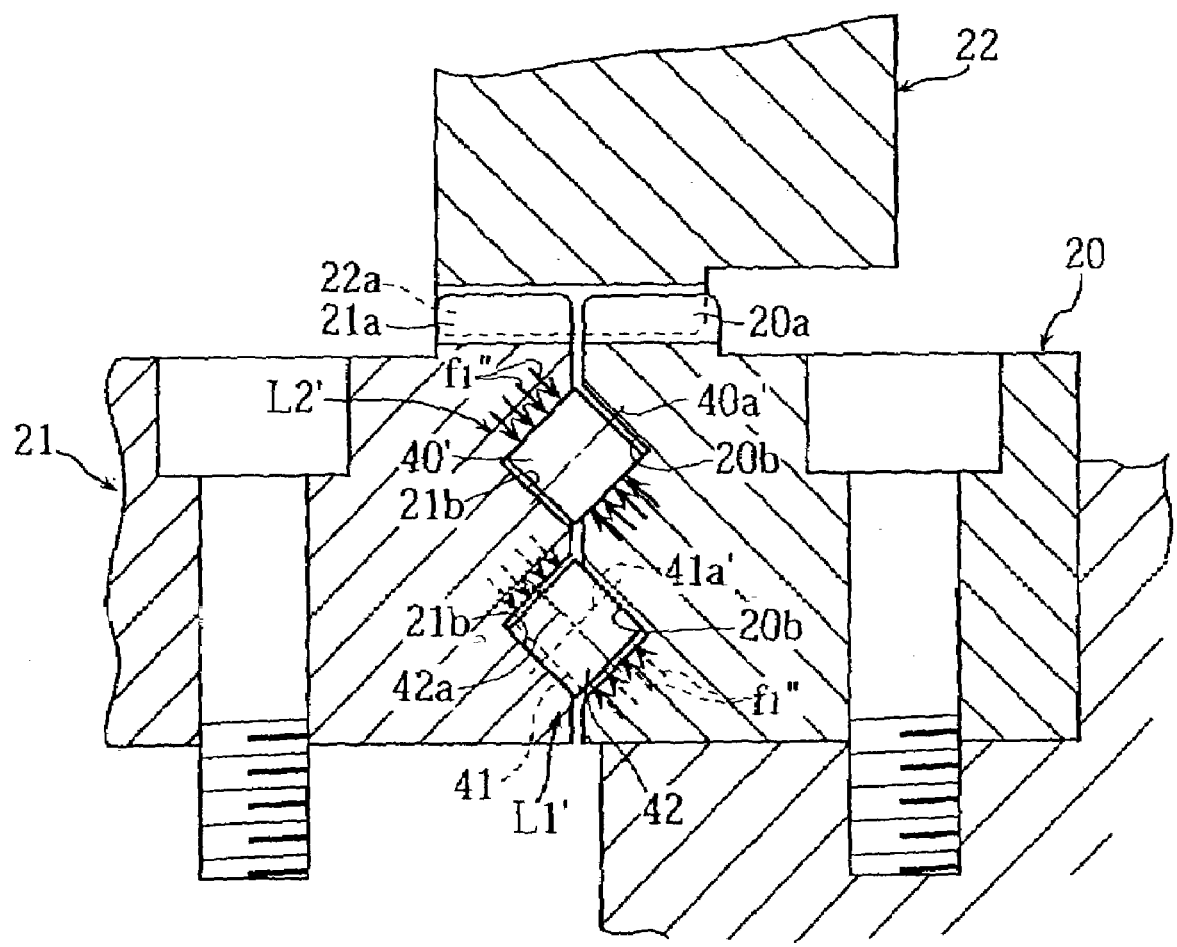
FIG. 8 is a detailed sectional view showing a clamped state of a portion of a rotational indexing device according to the second embodiment of the present invention.

FIGS. 1 through 4 are views for explaining the machine tool rotational indexing device according to the first embodiment of the present invention. FIG. 1 is a sectional view of the rotational indexing device. FIG. 2 is a sectional view showing the unclamped state of a portion of the rotational indexing device. FIG. 3 is a sectional view showing the clamped state of a portion of the rotational indexing device. FIG. 4 is a perspective view of a horizontal machining center having the rotational indexing device. In FIG. 1, the portion-located on the left-hand side of an indexing axis A shows the unclamped state, while the right-hand side shows the clamped state.

FIG. 4 shows a horizontal machining center 1, having a column 3 movable in the X-axis direction (horizontal detection) in a rear portion 2a of its fixed bed 2, and a saddle 4 movable in the Y-axis direction (vertical direction) in the column 3. A main shaft head 5 mounted with its axial line horizontally extended is provided movably in the Z-axis direction (depthwise direction) on the saddle 4. A main shaft 6 is rotatably inserted in the main shaft head 5, and the main shaft 6 is loaded with a detachable tool (not shown). Specified workpiece processing is performed by moving the main shaft 6 in the directions of the X-axis, the Y-axis and the Z-axis while rotatingly driving this main shaft 6 by means of a main shaft motor (not shown).

An anchor block 7 is arranged and fixed in a front portion 2b of the bed 2. A fixed base 8 is fixed on this anchor block 7, and a processing table 9 is mounted on the fixed base 8 via a rotational indexing device 10. This processing table 9 is loaded with a workpiece (not shown).

As shown in FIG. 1, the rotational indexing device 10 is provided with a rotary drive mechanism 13 for rotatively driving a swivel slide 11 rotatably provided on the fixed base 8 into a specified rotationally indexed position and a clamping mechanism 12 for clamping the swivel slide 11 in the rotational angle position. The processing table 9 is mounted and fixed on the swivel slide 11.

The swivel slide 11 is rotatably supported on the fixed base 8 via a bearing (not shown). An upper peripheral portion 8a of the fixed base 8 and a lower peripheral portion 11a of the swivel slide 11 overlap each other in a direction perpendicular to the indexing axis A. A sealing member 15 is provided between the upper and lower portions 8a and 11a to form a peripheral seal.

The clamping mechanism 12 is arranged inside the stationary-side coupling 20, which is annular when viewed in a plan view and is fastened and fixed with a bolt 16 in the fixed base 8 coaxially with the stationary-side coupling 20. The clamping mechanism 12 is provided with a rotary-side coupling 21, which is annular when viewed in a plan view and is bolted on the lower surface of the swivel slide 11. The clamping mechanism 12 is also provided with a joint coupling 22, which is annular when viewed in a plan view and it is arranged above both of the couplings 20 and 21. The joint coupling 22 is slidably supported in the direction of the indexing axis A on the swivel slide 11.

As shown in FIG. 2, in the unclamped state, the rotary-side coupling 21 protrudes toward the joint coupling 22 by a dimension t with respect to the stationary-side coupling 20. That is, the upper end surface of the rotary-side coupling 21 is located in a position slightly higher than the upper end surface of the stationary-side coupling 20. The dimension t is set at about 5 to 15 μm.

As shown in FIG. 3, both the couplings 20 and 21 are set so as to be located in same height positions in the clamped state. The quantity of movement during the pressurization of the rotary-side coupling 21 by the joint coupling 22 is thus made greater than that of the stationary-side coupling 20.

Meshing teeth 20a and 21a are formed with a prescribed pitch in the circumferential direction on the upper surfaces of the stationary-side and rotary-side couplings 20 and 21. Moreover, meshing teeth 22a are formed with a prescribed pitch in the circumferential direction on the lower surface of the joint coupling 22 so as to meshably oppose with both the meshing teeth 20a and 21a. This joint coupling 22 moves up and down between the clamped position in which it is securely in meshed engagement with both of the meshing teeth 20a and 21a of the stationary-side and rotary-side couplings 20 and 21 and the unclamped position where the engagement is released.

Moreover, the joint coupling 22 is slidably inserted in the direction of the axial line A in a cylinder member 25, which is annular when viewed in a plan view and is coaxially arranged outside the coupling 22. This cylinder member 25 is supported by the joint coupling 22 and the fixed base 8. A stepped portion 22b is formed on the outer peripheral wall of the joint coupling 22, and a protruding stepped portion 25a is formed on the inner peripheral wall of the cylinder member 25. A space surrounded by these members serves as a hydraulic chamber 26.

An oil passage 25b for supplying a hydraulic operating fluid into the hydraulic chamber 26 is formed in the cylinder member 25, and a hydraulic pressure supply source (not shown) is connected to the upstream end of the oil passage 25b. It is to be noted that a seal ring 27 is provided for preventing a leak of hydraulic fluid from the hydraulic chamber 26.

The joint coupling 22 moves down when the hydraulic chamber 26 is supplied with a hydraulic pressure. Its meshing teeth 22a come in meshing engagement with the meshing teeth 20a and 21a of the stationary-side and rotary-side couplings 20 and 21 so as to pressurize the same. By this operation, the rotary-side coupling 21 is fixed to the stationary-side coupling 20, and the processing table 9 is clamped in a specified rotational angle position set in accordance with the pitches of the meshing-teeth 20a and 21a.

A spring 30 is provided between the joint coupling 22 and the stationary-side coupling 20. The spring 30 urges the joint coupling 22 upwardly (in the meshing engagement release direction) by pressure. If the hydraulic pressure to the hydraulic chamber 26 is released, then the joint coupling 22 is moved up by the spring force of the spring 30, and the clamping is released.

The rotary drive mechanism 13 is provided with a large spur gear 35 that is fastened and fixed by a bolt 34. A rotation support member 33 is interposed therebetween on the lower surface of the rotary-side coupling 21. A small spur gear 36 is meshed with the large spur gear 35 and a servomotor 37 is provided for rotatingly driving the small spur gear 36. The rotation of this servomotor 37 is transmitted from the small spur gear 36 to the large spur gear 35 and the rotary-side coupling 21 and is thus transmitted to the swivel slide 11 via the rotary-side coupling 21, thereby indexing the processing table 9 in the specified rotational angle position. The large spur gear 35 can be moved slightly in the vertical direction with respect to the small spur gear 36. With this arrangement, the amount of descent of the rotary-side coupling 21 by the aforementioned dimension t can be absorbed.

Numbers of columnar rollers 41 and 40 are arranged between the inner peripheral surface of the stationary-side coupling 20 and the outer peripheral surface of the rotary-side coupling 21 so as to form lower and upper (first and second) rolling element rows L1 and L2. The lower rolling element row L1 is located farther from the meshing engagement portion of the joint coupling 22 and the rotary-side and stationary-side couplings 20 and 21 than the upper rolling element row L2.

Then, the rollers 40 and 41 of the upper and lower rolling element rows L2 and L1 are housed in a sectionally rhombic space defined by a V-shaped groove 20b formed on the inner peripheral wall of the stationary-side coupling 20 and a V-shaped groove 21b formed on the outer peripheral wall of the rotary-side coupling 21.

The rollers 40 and 41 are inclined so that the respective rotational axes 40a and 41a intersect with each other, for example, at right angles. In more detail, each roller 40 of the upper rolling element row L2 has its rotational axis 40a inclined at an angle of 45 degrees so that an upper portion of the axis crosses the indexing axis A, while each roller 41 of the lower rolling element row L1 has its rotational axis 41a inclined at an angle of 45 degrees so that a lower portion of the axis crosses the indexing axis A.

When the joint coupling 22 is located in an upper portion and the rotary-side and stationary-side couplings 21 and 20 are in the unclamped state (see FIG. 2), a small gap "a" is provided between both end surfaces 40b and 41b in the direction of the rotational axes 40a and 41a of the rollers 40 and 41 and the V-shaped grooves 20b and 21b. A lubricating oil can be supplied from the space "a" to the sliding contact surfaces of the rollers.

Then, in the aforementioned unclamped state, the outside diameter of each of the rollers 40 and 41 is formed approximately 5 μm greater than the dimension between the sliding contact surfaces of the V-shaped grooves 20b and 21b. The preload forces f1 and f2 are imposed between the rollers 40 and 41 and the sliding contact surfaces of the V-shaped grooves 20b and 21b. In more detail, the preload force f1 imposed on the roller 40 of the upper rolling element row L2 is imposed in a direction in which the preload force reduces as the joint coupling 22 is moved down to the clamped position, while the preload force f2 imposed on the roller 41 of the lower rolling element row L1 is imposed in a direction in which the preload force increases as the joint coupling 22 is moved down to the clamped position.

The operation and effects of the first embodiment will now be described.

When the processing table 9 is indexed and clamped in a new angular position from the clamped state in the specified angular position, the hydraulic pressure of the hydraulic chamber 26 is first released. Then, the joint coupling 22 is moved up by the spring force of the spring 30 to release the meshing engagement between the meshing teeth 22a of the joint coupling 22 and the meshing teeth 20a and 21a of both the couplings 20 and 21, thereby entering an unclamped state. In this unclamped state, the preload forces f1 and f2 are imposed on the rollers 40 and 41.

The servomotor 37 rotates in the unclamped state, and this rotation is transmitted from the rotary-side coupling 21 to the swivel slide 11 via the small and large spur gears 36 and 35, indexing the processing table 9 in the specified angular position. In this case, the rotary-side coupling 21 does not come in contact with the fixed base 8, and therefore, wear due to contact with the fixed base 8 does not occur.

If the rotary-side coupling 21 is indexed in the specified angular position, then the hydraulic pressure chamber 26 is supplied with hydraulic pressure. By this operation, the joint coupling 22 moves down to pressurize the rotary-side and stationary-side couplings 21 and 20 while bringing the meshing teeth 22a of the joint coupling 22 in meshing engagement with both of the meshing teeth 21a of the rotary-side coupling 21 and the meshing teeth 20a of the stationary-side coupling 20. This fixes the rotary-side coupling 21 in the specified angular position. The processing table 9 is thus clamped in the specified angular position, and processing is performed in this state.

A load from the processing table 9 and a clamping force from the joint coupling 22 imposed on the rotary-side coupling 21 in this processing state are borne on only the stationary-side coupling 20 via the rollers 40 and 41 of the upper and lower rolling element rows.

According to the present embodiment as described above, the rollers 40 and 41 that comprise the upper and lower rolling element rows are provided between the rotary-side coupling 21 and the stationary-side coupling 20. The load imposed on the rotary-side coupling 21 is borne on the rollers 40 and 41 of the upper and lower rolling element rows in the unclamped state. Therefore, the support rigidity of the rotary-side coupling 21 in the unclamped state can be improved.

In the clamping operation, the rotary-side coupling 21 is pressurized more by the amount of protrusion t than the stationary-side coupling 20 as the joint coupling 22 moves down. With this pressurization, the preload force f1 of the roller 40 of the upper rolling element row L2 decreases, whereas the preload force f2 of the roller 41 of the lower rolling element row L1 increases. Therefore, the support rigidity for the bending moment acting during processing in the clamped state can be secured. That is, the support rigidity for the bending moment is in proportion to a distance between the joint coupling 22 and the rolling element rows on which a large preload force is secured from the meshing engagement portion of the rotary-side coupling 21 and the stationary-side coupling 20. The present embodiment is structured so that a large preload force f2' is effected by the roller 41 of the lower rolling element row L1 located farther apart from the meshing engagement portion. Therefore, the rigidity for the bending moment can be improved.

Moreover, in the present embodiment, the rotary-side coupling 21 is coaxially arranged inside the stationary-side coupling 20. Therefore, the outside diameter of the stationary-side coupling 20 can be increased, and the support rigidity for the clamping force can be improved by that much. Consequently, this allows the support force of the rotary-side coupling 21 to be improved.

Furthermore, in the present embodiment, the upper end surface of the rotary-side coupling 21 is located in a position higher by dimension t than the upper end surface of the stationary-side coupling 20. Therefore, the joint coupling 22 pressurizes the rotary-side coupling 21 more than the stationary-side coupling 20 to impose a greater preload force on the roller 41 in the lower rolling element row L1. Therefore, the support rigidity of the rotary-side coupling 21 can be improved in cooperation with the greater distance from the meshing engagement portion to the roller 41.

Since the rollers 40 and 41 are arranged in two rows, the roller diameters can each be made smaller than in the conventional case while maintaining support rigidity. This allows the differential slip factor to be reduced and allows the frictional coefficient to be reduced.

It is possible to integrate the rotary-side coupling 21 that serves as an inner ring of the upper and lower rollers 40 and 41 with the stationary-side coupling 20 that serves as an outer ring. If this arrangement is adopted, both the couplings 20 and 21 are allowed to have the same center axis, and the assembly work can be easily performed.

FIGS. 5–8 are views for explaining the second embodiment according to a further aspect of the present invention, in which the same reference numerals as those shown in FIGS. 2 and 3 denote the same or corresponding portions.

In the second embodiment, the upper rolling element row (1a-th rolling element row) L2' is constructed of numbers of columnar rollers 40' that are arranged so as to be inclined and have a rotational axis 40a' in a first direction that crosses the indexing axis A at an angle of 45 degrees below the rolling element row L2'.

Then, the lower rolling element row (2a-th rolling element row) L1' is a so-called cross roller bearing in which a columnar first roller 41' has a rotational axis 41a' inclined in the same direction as the first direction and a columnar second roller 42 that has a rotational axis 42a in a second direction perpendicular to the first direction. The columnar first roller 41' and the columnar second roller 42 are alternately arranged.

In this case, preload forces f1' are imposed on the roller 40' of the upper rolling element row L2' and the first roller 41' of the lower rolling element row L1' in a direction in which the preload forces increase as the joint coupling 22 is moved to the clamped position. On the other hand, a preload force f2' is imposed on the second roller 42 of the lower rolling element row L1' in a direction in which the preload force decreases as the joint coupling 22 is moved to the clamped position. The rotary-side coupling 21 is supported on only the stationary-side coupling 20 via the upper and lower rolling element rows L2' and L1'.

In the second embodiment, the rotary-side coupling 21 is pressurized more by the amount of protrusion t than the stationary-side coupling 20 as the joint coupling 22 moves down. With this pressurization, the preload force f2' of the second roller 42 of the lower rolling element row L1' decreases, whereas the preload force f1' of the roller 40' of the upper rolling element row L2' and the preload force f1' of the first roller 41' of the lower rolling element row L2' increase. Therefore, the support rigidity in the clamped state of the rotary-side coupling 21 can be secured.

As described above, according to the second embodiment, the lower rolling element row is provided by the cross roller bearing, and the preload force f1' on the first roller 41' increases as the joint coupling 22 moves to the clamped position. With this arrangement, the problem that the preload decreases in the clamped state can be avoided, and sufficient support rigidity can be maintained.

In the second embodiment, it is also possible to vertically exchange the lower and upper rolling element rows L1' and L2'. If this arrangement is adopted, the rolling element row L2' that has a greater preload force is located in the position farther from the meshing engagement portion in the clamped state, and the support rigidity for the bending moment can be improved further.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2001-400796 filed Dec. 28, 2001 is hereby incorporated by reference.

What is claimed is:

1. A machine tool rotational indexing device having a rotary section which is loaded with at least one of a workpiece and a tool, the rotary section is rotationally and indexably mounted in a predetermined rotational angular position and clamped in an indexed position on a fixed base, the device comprising:
   a rotary-side coupling attached to the rotary section;
   a stationary-side coupling attached to the fixed base, the rotary-side coupling being arranged coaxially with the stationary-side coupling;
   a joint coupling disposed adjacent to both the rotary-side coupling and the stationary-side coupling, the joint coupling being arranged to move between a clamped position and an unclamped position, wherein the clamped position is where the joint coupling meshes with both the rotary-side coupling and the stationary-side coupling and the unclamped position is where the joint coupling is spaced apart from both the rotary-side coupling and the stationary-side coupling; and
   a plurality of rolling elements arranged between the rotary-side coupling and the stationary-side coupling so that a plurality of rolling element rows are formed and a prescribed preload force acts on the rolling elements when the joint coupling is disposed in the unclamped position, wherein a first rolling element row is positioned farther from the joint coupling than a second rolling element row,
   the rolling element rows being constructed between the rotary-side coupling and the stationary-side coupling so that the prescribed preload force increases on the first rolling element row and the prescribed preload force decreases on the second rolling element row when the joint coupling moves to the clamped position, and
   an outer surface of the rotary-side coupling being supported on the stationary-side coupling by the first and second rolling element rows.

2. The machine tool rotational indexing device as claimed in claim 1, wherein the rolling elements of the first and second rolling element rows each comprise a columnar roller, and rotational axes of adjacent rollers between the first and second rolling element rows intersect with each other.

3. The machine tool rotational indexing device as claimed in claim 2, wherein in the unclamped position, the rotary-side coupling protrudes slightly toward the joint coupling compared with the stationary-side coupling.

4. The machine tool rotational indexing device as claimed in claim 2, wherein the rotary-side coupling is disposed inside the stationary-side coupling.

5. The machine tool rotational indexing device as claimed in claim 4, wherein in the unclamped position, the rotary-side coupling protrudes slightly toward the joint coupling compared with the stationary-side coupling.

6. The machine tool rotational indexing device as claimed in claim 1, wherein the rotary-side coupling is disposed inside the stationary-side coupling.

7. The machine tool rotational indexing device as claimed in claim 6, wherein in the unclamped position, the rotary-side coupling protrudes slightly toward the joint coupling compared with the stationary-side coupling.

8. The machine tool rotational indexing device as claimed in claim 1, wherein in the unclamped position, the rotary-side coupling protrudes slightly toward the joint coupling compared with the stationary-side coupling.

9. A machine tool rotational indexing device having a rotary section which is loaded with at least one of a workpiece and a tool, the rotary section is rotationally and indexably mounted in a predetermined rotational angular position and clamped in an indexed position on a fixed base, the device comprising:

a rotary-side coupling attached to the rotary section;

a stationary-side coupling attached to the fixed base, the rotary-side coupling being arranged coaxially with the stationary-side coupling;

a joint coupling disposed adjacent to both the rotary-side coupling and the stationary-side coupling, the joint coupling being arranged to move between a clamped position and an unclamped position, wherein the clamped position is where the joint coupling meshes with both the rotary-side coupling and the stationary-side coupling and the unclamped position is where the joint coupling is spaced apart from both the rotary-side coupling and the stationary-side coupling; and a plurality of rolling elements arranged between the rotary-side coupling and the stationary-side coupling so that a plurality of rolling element rows are formed and a prescribed preload force acts on the rolling elements when the joint coupling is disposed in the unclamped position, and an outer surface of the rotary-side coupling being supported on the stationary-side coupling by the first and second rolling element rows.

10. The machine tool rotational indexing device as claimed in claim 9, wherein the rotary-side coupling is disposed inside the stationary-side coupling.

11. The machine tool rotational indexing device as claimed in claim 10, wherein in the unclamped position, the rotary-side coupling protrudes slightly toward the joint coupling compared with the stationary-side coupling.

12. The machine tool rotational indexing device as claimed in claim 9, wherein in the unclamped position, the rotary-side coupling protrudes slightly toward the joint coupling compared with the stationary-side coupling.

13. The machine tool rotational indexing device as claimed in claim 9, wherein the rolling element rows comprising a first row of rolling elements that are columnar rollers each having a rotational axis and a second row of rolling elements, first alternate rolling elements of the second row each having a rotational axis parallel to the rotational axis of an adjacent rolling element in the first row and second alternate rolling elements of the second row each having a rotational axis that will intersect with the rotational axis of an adjacent rolling element in the first row, and the rolling element rows being structured between the rotary-side coupling and the stationary-side coupling so that the prescribed preload force increases on the rolling elements in the first row and the first alternate rolling elements of the second row and the prescribed preload force decreases on the second alternate rolling elements of the second row when the joint coupling moves to the clamped position.

* * * * *